US006326024B1

(12) United States Patent
Vasilatos-Younken

(10) Patent No.: US 6,326,024 B1
(45) Date of Patent: Dec. 4, 2001

(54) FEED WITHDRAWAL COMPOSITIONS AND METHODS

(75) Inventor: Regina Vasilatos-Younken, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 0 days.

(21) Appl. No.: 09/360,021

(22) Filed: Jul. 23, 1999

Related U.S. Application Data

(60) Provisional application No. 60/117,068, filed on Jan. 25, 1999, and provisional application No. 60/096,074, filed on Aug. 11, 1998.

(51) Int. Cl.$^7$ ...................................................... A23K 1/61
(52) U.S. Cl. ........................... 424/442; 424/438; 514/60; 426/53
(58) Field of Search ..................................... 424/438, 442; 514/60; 426/807, 635, 53

(56) References Cited

U.S. PATENT DOCUMENTS

| | | |
|---|---|---|
| 3,849,194 | 11/1974 | Armbruster et al. . |
| 3,853,706 | 12/1974 | Armbruster . |
| 4,167,584 | 9/1979 | Nelson . |
| 4,447,532 | 5/1984 | Coker et al. . |
| 4,689,088 | 8/1987 | Morehouse et al. . |
| 4,699,670 | 10/1987 | Morehouse et al. . |
| 4,957,748 | 9/1990 | Winowiski . |
| 5,886,168 | 3/1999 | Brumm . |

FOREIGN PATENT DOCUMENTS

| | | |
|---|---|---|
| 2153839 A | 5/1972 | (DE) . |
| 2447152 * | 8/1980 | (FR) . |
| 38955 T | 7/1986 | (HU) . |

* cited by examiner

*Primary Examiner*—Neil S. Levy
(74) *Attorney, Agent, or Firm*—Dann Dorfman Herrell and Skillman, P.C.

(57) ABSTRACT

A feed withdrawal composition is described which includes at least 70% by weight of a low D.E. starch hydrolysate. Due to the high solubility and digestibility characteristics of the composition, the composition may be fed to the animal up to 1–2 hours prior to slaughter. The composition results in (1) improvement in live weight at slaughter; (2) increased product yield and/or quality; and (3) reduced risk of carcass contamination in comparison to conventional programs of total feed withdrawal prior to slaughter.

17 Claims, No Drawings

FEED WITHDRAWAL COMPOSITIONS AND METHODS

CROSS-REFERENCE TO A RELATED APPLICATION

This application is a continuation-in-part of copending, commonly assigned provisional applications Ser. No. 60/117,068 filed Jan. 25, 1999, and Ser. No. 60/096,074 filed Aug. 11, 1998, the disclosures of which are hereby incorporated by reference.

BACKGROUND OF THE INVENTION

At the end of grow-out, feed is typically withdrawn from meat producing monogastric animals for a period of time prior to livehaul, in order to minimize feed wastage and empty the gastrointestinal tract (GIT) of contents. The latter is of primary importance, in that failure to properly empty the GIT may result in contamination of the carcass from ingesta and/or fecal material during processing. During the feed withdrawal period, however, particularly if this period is prolonged, the yield of salable product is reduced, and negative effects on product quality due to tissue dehydration, etc. can result. In addition, as the period of withdrawal continues, progressive loss (breakdown) of the intestinal lining (mucosa) occurs, with thinning of the gut wall and liquification of its contents. This dramatically increases the risk for microbial contamination during mechanical evisceration and subsequent steps in processing.

The process of feed withdrawal is a balancing act, with less than ideal results, even under the best circumstances. With no feed withdrawal, the upper portion of the GIT is generally filled with feed particles that vary in consistency and moisture content, depending upon region of the tract and stage of digestion, with the upper portion of the tract particularly at risk for regurgitation of contents during handling and processing of the animal. Once feed is withdrawn, the upper portion of the tract empties, however, emptying of the lower portion tends to decline beyond a certain time period. This is largely a function of the decline in lower gut motility and removal of upper gut stimuli (which normally induce evacuation of the rectum) that occurs when feed intake ceases. As feed withdrawal times increase, breakdown of the mucosal lining (which is maintained only with feed ingestion) occurs. This increases the risk for fecal contamination and "watery guts" syndrome, particularly if total time without feed extends beyond 12 hours, a situation that realistically does occur in commercial practice.

Ideally, animals should be maintained on feed and water for as long as possible prior to slaughter. This would minimize stress, and maximize live weight and dressed yield, and maintain soft tissue (i.e., skeletal muscle) hydration and product quality. However, the issue of carcass contamination and related food safety issues are of paramount concern to the industry.

A product with nutritive value and palatable to, but rapidly and completely digested by the animal, would provide a mechanism to allow animals to remain fed and hydrated until close to the time of slaughter, with no increase in the risk for contamination during processing. Accordingly, the invention methods, and compositions are disclosed which accomplish this objective.

SUMMARY OF THE INVENTION

The feed withdrawal composition disclosed herein is a predominantly starch hydrolysate product which is almost totally digestible to monogastric species, including humans, and therefore contributes essentially no residue to the lower intestinal tract when consumed.

DETAILED DESCRIPTION OF THE INVENTION

According to the present invention, compositions and methods are disclosed which are applicable to any monogastric meat animal. This would include domestic poultry (such as chickens, turkeys, and ducks), as well as mammalian species (such as swine). The compositions and methods result in improvement in live weight at slaughter, increased product yield and/or quality and reduced risk of carcass contamination in comparison to conventional programs of total feed withdrawal prior to slaughter.

The highly digestible nature of the components of the formulated product contribute virtually no residue to lower gut contents. Animals taken off feed and fed the feed withdrawal composition of the invention maintain a normal lower gut motility; thus emptying of residue remaining from the feed will occur much more completely than occurs with conventional feed withdrawal. Also, because of the high solubility and digestibility of the formulated product, the time required to empty the upper portion of the gastrointestinal tract of composition is nominal in comparison to conventional feed withdrawal periods. Thus, once feed has moved through the tract as a result of withdrawing feed and offering only the composition of the invention for a period, the time required to reduce the presence of composition in the upper portion of the tract is nominal (approximately 1–2 hours).

It is further contemplated that the compositions and methods of this invention may be used for various conditions and circumstances other than feed withdrawal wherein it is desired to empty feed residue from the gastrointestinal tract of an animal. Such conditions and circumstances are readily ascertainable by those skilled in the art and may include but are not limited to farrowing, preparation for medical testing, medical procedures, etc.

The compositions and methods of the invention are primarily fed to animals prior to slaughter during the same period within which all feed is removed under current practices. Traditionally this is within the final 24 hours before slaughter. The composition of the invention may instead be provided to these animals ad libitum after final growth, continuing up to 1–2 hours prior to slaughter, as a couple hours is the only time necessary to remove the fast absorbing components from the digestive tract of the animal.

The composition of the invention comprises primarily a starch hydrolysate in the amount of 70% by weight or greater, to be directly administered to the animals primarily in the form of a solid composition. While the composition will perform its intended purpose if the starch hydrolysate is included in a concentration of at least 70%, it appears to perform best within the range of from about 80–85% by weight starch hydrolysate, depending on the species of animal being fed and whether the composition also includes a highly digestible protein source, such as egg white. For instance, 84% by weight composition is optimum if the composition includes egg white and is fed to a broiler chicken. Generally, if the composition includes a non-animal protein source, the amount of starch hydrolysate will be slightly lower than if an animal protein source of high biological value is included. From an economical standpoint, the composition preferably contains from about 84–99.9%, starch hydrolysate since the starch hydrolysate is normally less expensive than various other carriers and nutrients that may also be included in the formulation.

The "starch hydrolysates" of this invention are also referred to in the art as maltodextrins, corn syrup solids, and starch conversion products. The starch hydrolysates of this invention are low dextrose equivalent (DE) starch hydrolysate. DE is a common expression in the art for describing the total reducing sugars content of a material, expressed as percent dextrose, dry basis. Such starch hydrolysates for use in this invention are characterized by blandness of taste and low sweetness. They are also fully and readily soluble in water and non-hygroscopic. The starch hydrolysates for use in this invention have a low D.E. of preferably between about 15–25, with a preferred D.E. of between about 15–20, and a most preferred D.E. of about 18. Such low D.E. starch hydrolysates and starch conversion products are known in the art. Generally, they are produced by the hydrolysis of starch with acids or enzymes. Various production methods for starch hydrolysates are described in U.S. Pat. Nos. 4,689,088, 3,849,194, 3,853,706, 4,447,532, 4,699,670, and 5,886,168, the disclosures of which are hereby incorporated by reference. The feed withdrawal product of this invention may include one starch hydrolysate having a particular D.E., or a mixture of more than one starch hydrolysate having different D.E.s, so long as the cumulative D.E. range of the hydrolysates is between about 15–25.

The starch hydrolysates may be derived from various starch sources, including potato, red milo, tapioca, wheat, rice, and corn. Starch hydrolysates are commonly available additives used primarily in human food processing formulations and is a carbohydrate generally of the formula $H(C_6H_{10}O_5)$—OH. Starch hydrolysates are available for example from Grain Processing Corporation, Muscatine, Iowa under the trademark MALTRIN®. See product information sheets listed at Example 2. Additionally, starch hydrolysates are commercially available from other sources such as Corn Products Company, Cedar Rapids, Iowa; Cerestar USA, Inc., Hammond, Ind.; A.E. Staley Manufacturing Co., Decatur, Ill.; ADM Corn Processing, Decatur, Ill.; and Roquette America, Inc., Keokuk, Iowa. Any source of starch hydrolysate may be used in accordance with the teachings herein.

The feed withdrawal composition may be formulated with various other active and/or inactive ingredients that do not substantially contribute to the formation of a residue in the lower gut contents of the animal, and do not interfere with the effectiveness of the feed composition. For example, the product is preferably formulated with water for liquid formulations. In solid formulations, the starch hydrolysate feed withdrawal composition essentially binds to itself, thus alleviating the need to include conventional feed carriers, such as cereal grains and grain or grass byproducts. Often, an ingredient serves more than one purpose in the compositions of the present invention. For instance, if egg white is used as the highly digestible protein source, it may also be a carrier.

The starch hydrolysate may be provided to the animals in either liquid or solid forms, and can optionally include other additives and ingredients to optimize intake and utilization of the starch hydrolysate. For example, in a preferred embodiment the starch hydrolysate feed withdrawal composition of the invention includes the addition of a sodium salt such as sodium chloride to activate sodium dependent glucose transporter mechanisms to increase glucose uptake in the intestine. Traditionally the sodium salt component is a source of sodium and can comprise less than ½ percent up to 1% of the composition. However, if egg white is included in the composition, then sodium salt should not be added, since egg white already contains a substantial amount of sodium.

In another preferred embodiment, the feed withdrawal composition of the invention may include a water soluble, highly digestible protein source to increase the nutritional value. Such highly digestible protein sources may include, but are not limited, to dehydrated egg powder, egg white, casein, hydrolyzed vegetable protein, ovalbumin, and lactalbumin. Other highly digestible protein sources are readily ascertained by those skilled in the art. The feed withdrawal composition may contain up to 30% by weight protein. The composition preferably contains about 16% protein.

The feed withdrawal composition may also contain up to 7% by weight of a highly digestible lipid source, such as the lipid component found in dehydrated egg powder. If the composition includes lipid, the protein is preferably included in its upper range of about 30% by weight. If no lipid is included in the composition, the composition preferably contains closer to about 16% by weight protein.

In all feed withdrawal composition formulations, the primary ingredient will be starch hydrolysate which will comprise 70% or greater of the formulation. Traditionally, this composition is fed during the end of the grow-out period, primarily in the last 24 hours at the time of withdrawal of feed.

Starch hydrolysates are typically used in a number of human food processes. They have been used as an agent for fat reduction in frozen desserts, meats, salad dressings and sauces, as a cyroprotectant for frozen foods or as an additive for frozen desserts, for meats, for processed meats and spices and seasonings, as a tableting binder for pharmaceutical formulations, as a spray drying aid for cheeses and fats, and as a flavorant for fruit juices and syrups.

Several formulations, both liquid and solid phase, have been made in accordance with the teachings herein. In a most preferred embodiment, the feed withdrawal composition is solidified and colored to resemble traditional feed as closely as possible. These formulations are not intended to limit the scope of the invention in any way, and the addition of other additives and excipients to maximize the benefits of the starch hydrolysate feed withdrawal compositions of the invention are considered nothing more than routine experimentation to optimize parameters known to those of skill in the art.

TABLE 1

Starch Hydrolysate Based Solid-Phase Feed Withdrawal Composition Formulations

| Ingredient | MD0 | MD20 | MD16 | MD12 |
|---|---|---|---|---|
| | % | | | |
| Maltrin (M150 ™* or M180ä) | 98.6602 | 79.6358 | 83.5122 | 87.3889 |
| Dehydrated Egg White (Ovalbumin) | 0 | 20.0 | 16.0 | 12.0 |
| Salt (NaCl) | .3584 | — | — | — |
| Tri-Potassium Citrate/Monohydrate ($C_6H_5K_3O_7 \cdot H_2O$) | .9748 | .3576 | .4812 | .6045 |
| Vitamins (see below) | .0066 | .0066 | .0066 | .0066 |
| Total | 100 | 100 | 100 | 100 |
| | g/kg | | | |
| Maltrin (M150ä ™* or M180ä) | 986.6 | 796.3 | 835.1 | 873.9 |
| Dehydrated Egg White (Ovalbumin) | 0 | 200.0 | 160.0 | 120.0 |

TABLE 1-continued

Starch Hydrolysate Based Solid-Phase Feed Withdrawal Composition Formulations

| Ingredient | MD0 | MD20 | MD16 | MD12 |
|---|---|---|---|---|
| Salt (NaCl) | 3.584 | — | — | — |
| Tri-K Citrate/Monohydrate ($C_6H_5K_3O_7 \cdot H_2O$) | 9.748 | 3.576 | 4.812 | 6.045 |
| | mg/kg | | | |
| Thiamine | 3.6 | 3.6 | 3.6 | 3.6 |
| Riboflavin ($B_2$) | 6.0 | 6.0 | 6.0 | 6.0 |
| Niacin | 50.0 | 50.0 | 50.0 | 50.0 |
| Pyridoxine ($B_2$) | 6.0 | 6.0 | 6.0 | 6.0 |

*M150a and M180a are products of Grain Processing Corporation, Muscatine, Iowa.

Starch hydrolysates are highly soluble in cold water, and provide approximately 4 kcal of energy as carbohydrate/g. Commercially available starch hydrolysates can be obtained in a range of degrees of polymerization (as a function of the degree of hydrolysis of the starting material—starch). Grades were selected that limit the amount of free glucose in the product, which allows for a formulation that will maintain the osmolality of the gut lumen within the physiological range of body fluids (approximately 300 mO smol/kg). This prevents alterations in body fluid balance (and, consequently, tissue hydration) that can occur with hyper- or hypo-osmotic solutions. Other possible materials that would be highly digestible (e.g., pure dextrose or sugar) contribute to the osmolality of the gut and, consequently, result in changes in body fluid balance (i.e., diarrhea and dehydration).

The feed withdrawal composition developed may be for use in any form including: a liquid, and as a solid phase particulate form. As a liquid composition (LC), it is preferably formulated together with electrolytes to further maintain fluid balance and provide sodium for activation of the Na-dependent glucose transporter in the small intestine. These electrolytes may include sodium and potassium salts, such as chlorides, carbonates, and citrates or other component salts. As a practical matter, citrates are often included as part of the electrolyte component of the feed composition to prevent the inclusion of too high of a level of chloride. While the formulations above specify the use of tri-potassium citrate as a component salt, alternative component salts, such as $K_2CO_3$ and $KHCO_3$, may also be used.

Other optional ingredients include B-vitamins (involved in pathways of carbohydrate metabolism), and dextrose (for palatability and to adjust total osmolality). A starch hydrolysate with a dextrose equivalent (DE) of 15–18 is used (e.g., Maltrin®-M180 or Maltrin®-M150; products of Grain Processing Corporation, Muscatine, Iowa).

Another formulation of the feed withdrawal liquid composition is as follows:

| Ingredient | Amount per Liter[1] | Unit |
|---|---|---|
| Maltrin ®-M150* | 180 | g |
| Dextrose | 35 | g |
| NaCl | .312 | g |
| KCl | .176 | g |
| Tri-K-Citrate | 1.12 | mg |
| Thiamine | .77 | mg |
| $B_2$ (Riboflavin) | 1.28 | mg |
| Niacin | 10.64 | mg |
| $B_6$ (Pyridoxine) | 1.28 | mg |

*Note - Maltrin ®-M180 can be substituted for M150.
[1]Components dissolved and total volume brought to 1 liter in tap water.

The physical form of the feed withdrawal composition may be altered within certain guidelines depending upon the biological needs of the species for which the composition is intended. For example, in poultry, and specifically market age boilers, the size, shape, and surface texture of the composition particles must be suitable for the bird to grasp the particles in its beak and swallow. For instance, if the particles are too round or smooth, the birds will not be physically able to pick up the particles in their beaks.

Further, the moisture content of the feed withdrawal composition must be relatively low to discourage microbial growth and prevent handling problems within the commercial feeding system. For example, a composition that is too moist tends to bridge and fuse into larger, solid masses, that clog the mechanical feeding systems. Such problems are readily avoided by persons skilled in the art of animal feed formulation techniques.

According to the invention, chickens fed the feed withdrawal composition of the invention prior to slaughter in solid form had an increased final live weight prior to slaughter, compared to those that underwent traditional feed withdrawal. Traditionally birds under conventional feed withdrawal lose 2½ to 8% of their body-weight and can be off feed for as long as 24 hours. Those which were fed the feed withdrawal composition according to the invention experienced, on average, a less than 1% change in their overall body-weight.

Additionally, the compositions and methods of the invention as applied to poultry are beneficial with regard to new regulations restricting the amount of water taken up during the slaughter process. Carcasses of animals fed the composition in accordance of the present invention were shown to take up no more than, and in some cases, less water, as little as half of the water that a normal carcass takes up during processing. Less water results in more meat per pound as well as improved shelf life.

Poultry fed the composition of the invention further had no difference in the gastrointestinal contents from that of birds which had been starved by feed withdrawal prior to slaughter. GI tract integrity was also maintained, reducing the sloughing off of the intestinal lining which often occurs in birds which are without feed for up to 24 hours prior to processing.

The following examples serve to illustrate the principles of the invention and are in no way intended to limit the scope thereof.

EXAMPLES

Example 1

Materials and Methods

One hundred fifty, six-week-old female broiler chickens of a commercial cross were allocated to six pens (25 birds per pen). Birds were selected to have comparable body weights and were leg banded. Two pens (50 birds) were assigned to each of three treatments as follows:

1). 12 hour feed withdrawal prior to processing, representing the average time commonly practiced by the commercial poultry industry. This served as a control group.

2). Composition MD-0 (starch hydrolysate-based composition with no protein added)

3). Composition MD-16 (starch hydrolysate-based composition with 16% dried egg albumin added by weight).

In this example, the brands Maltrin-150 and Maltrin-180 of starch hydrolysate were used. However, as can be appreciated by those skilled in the art, any starch hydrolysate-based composition may be used for purposes of this invention.

Both composition groups had salts and vitamins added to them (Table 5 supra). To ensure the acceptability of the diets, an acclimation period was used in which a 50% composition:50% broiler feed mixture was supplied for 4 hours, followed by a 75% composition:25% broiler feed mixture for an additional 4 hours. During the acclimation period, the control group remained on its regular feeding schedule (see Table 3). At the end of the acclimation period, each of the respective compositions was supplied alone for 9 hours, while broiler feed was removed from the control group. Compositions were removed 3 hours prior to processing of all birds, thus, allowing for a total of 12 hours of feed withdrawal for the control group, and only 3 hours for the composition groups. Live body weight, and composition and broiler feed consumption were obtained for each experimental period. Hot, eviscerated carcass weight, and chilled weight (chilled for 1 hour and drained for 15 minutes) were also recorded. The chilled carcasses were packaged individually in sample bags and refrigerated over night. The next day, a final chilled weight was obtained. Visual assessments of the GIT of 15 birds of each composition group and 20 birds of the control group were determined. The crop, gizzard, small intestine, right cecum, and rectum were excised, cut open, and a subjective visual score was given according to the apparent quantity of contents. A score of 1 indicated a completely empty organ, a score of 2 was given for organs that had some residue, and a score of 3 was given for organs that were still filled with feed or fecal contents (see Table 4).

Statistical Analysis

Data were analyzed by one-way analysis of variance (ANOVA) using the General Linear Models (GLM) procedure of the Statistical Analysis System (SAS Institute, 1988). When significant differences among treatments were found, means were separated by t-tests. Body weight at the initiation of the experimental period were used as a covariate in the model statement. All statements of significance were based on a probability level of 5%.

Results and Discussion

Final live weights of birds fed composition MD-16 were significantly greater than those of the control group, but not different from the MD-0 group (Table 2). Live weight was significantly reduced (66 g) for the control group as compared to the MD-0 (28 g) and MD-16 (17 g) groups. Feeding MD-0 or MD-16 resulted in a significant reduction (approximately 50% less) in carcass water uptake during chilling (45 g for control vs 29g for MD-0 and 24 g for MD-16 (Table 2).

Water uptake is becoming a major concern to poultry processors since USDA-FSIS proposed new regulations limiting the amount of water retained by raw meat and poultry products as a result of carcass washing, chilling, or other post-slaughter processing (USDA-FSIS, 1998). If this proposed regulation is approved and instituted, companies would have to disclose on the retail label the maximum percentage of retained water that could be in raw, primary processed products. Because excessive water retention means that the product is adulterated, FSIS has consistently required that the retention of water in meat and poultry be limited to amounts that are considered unavoidable (USDA-FSIS, 1998).

The gastrointestinal tract (GIT) of 20 control birds and 15 birds of each of composition group were also collected and evaluated. Visual assessments as well as quantitative measurements were obtained to establish the physiological efficacy of the starch hydrolysate-based composition. Because our objective was to develop a dietary composition that would also help in emptying the GIT by maintaining lower GIT motility, and at the same time be completely digestible and absorbed, we examined the GIT for any signs of composition residue (un-digested) as well as overall GIT integrity and cleanliness. Visual assessment (Table 4) indicated no significant difference in the contents for the crop, gizzard, and rectum. However, intestinal scores of both composition groups were significantly lower (i.e., cleaner) than the controls. Although the control group was without feed for 12 hours, feed and fecal material were still observed in the lower parts of the intestine, mainly due to reduced lower GIT motility. Feeding the composition provided normal physiological stimuli which maintained proper lower GIT motility and consequently the emptying of fecal residue. Ceca of the MD-16 group were significantly cleaner than both MD-0 and Control groups.

Feeding either starch hydrolysate-based composition resulted in reduced live weight shrinkage as compared to the conventional feed withdrawal method. Starch hydrolysate feed withdrawal compositions were accepted and completely digested by the birds. Both starch hydrolysate groups had a significantly lower carcass water uptake after chilling. Feeding the compositions helped in maintaining lower GIT motility and thus, resulted in a cleaner overall GIT, with virtually no feed withdrawal required.

TABLE 2

Evaluation of a nutritive-solid composition during the withdrawal period in female broiler chickens at six weeks of age.

| Treatment[2] (N) | Final Live Weight (g) | Weight Change due to treatment (g) | Percent Wt Change[3] | Hot Carcass Weight (g) | Chilled Carcass Weight (g) | Water Uptake (g) | Percent Water Uptake |
|---|---|---|---|---|---|---|---|
| Control (50)[4] | 2257[b] | (−) 66[a] | (−) 2.8[a] | 1596 | 1641 | 45[a] | 2.8[a] |
| MD-0 (50) | 2271[ab] | (−) 28[b] | (−) 1.2[b] | 1606 | 1635 | 29[b] | 1.8[b] |

Performance Parameters[1]

TABLE 2-continued

Evaluation of a nutritive-solid composition during the withdrawal period in female broiler chickens at six weeks of age.

| | Performance Parameters[1] | | | | | | |
|---|---|---|---|---|---|---|---|
| Treatment[2] (N) | Final Live Weight (g) | Weight Change due to treatment (g) | Percent Wt Change[3] | Hot Carcass Weight (g) | Chilled Carcass Weight (g) | Water Uptake (g) | Percent Water Uptake |
| MD-16 (49) | 2289[a] | (−) 17[b] | (−) 0.7[b] | 1599 | 1623 | 24[b] | 1.5[b] |
| SEM | 7.96 | 8.51 | 0.34 | 6.81 | 6.79 | 2.31 | 0.14 |
| Pr > F | 0.0196 | 0.0002 | 0.0001 | 0.5518 | 0.1620 | 0.0001 | 0.0001 |

[1]Values are adjusted to the initial weight before the initiation of treatments.
[2]Feed was withdrawn 12 hrs before processing. MD-0 (no egg albumin added) and MD-16 (16% egg albumin added) were fed for 9 hr. followed by 3 hr withdrawal before processing.
[3]The change represents either a gain or shrinkage in body weight.
[4]Conventional Feed Withdrawal.
Values within a column with no common superscript differ significantly (P < 0.05).

TABLE 3

Broiler feed and feed withdrawal composition consumption (g) by six-week-old female broiler chickens.

| | Experimental Period | | | | | | | | |
|---|---|---|---|---|---|---|---|---|---|
| | 50:50 | 75.25 | Acclimation Period (8 hr) | | Total | 9 hr on 100% composition & | Total 17 hr | Total 20 hr consumption | |
| Treatment | Acclimation[1] (4 hr) | Acclimation[2] (4 hr) | Broiler Feed | Compositn | Acclimation Period | 3 hr with no composition | consumption | Broiler Feed | Composition |
| Control (50)[3] | 0 | 0 | 41.6 | 0 | 41.6 | 0 | 41.6 | 41.6 | 0 |
| MD-0 (50) | 7.3 | 10.9 | 11 | 18.2 | 29.2 | 31.2 | 60.4 | 11 | 49.4 |
| MD-16 (49) | 6.6 | 9.9 | 10 | 16.5 | 26.5 | 35.3 | 61.7 | 10 | 51.8 |

[1]Acclimation Mixture = 50% composition, 50% broiler feed
[2]Acclimation Mixture = 75% composition, 25% broiler feed
[3]Conventional Feed Withdrawal.

TABLE 4

Evaluation of a residual content in various segments of the gastrointestinal tract by visual scoring, of six week old female broilers fed a nutritive-solid composition during the withdrawal period.

| | Visual Assessment Score[1] | | | | |
|---|---|---|---|---|---|
| Treatment[2] (N) | Crop | Gizzard | Intestine | Ceca | Rectum |
| Control (20)[3] | 1.15 | 1.60 | 1.55[a] | 2.73[a] | 1.47 |
| MD-0 (15) | 1.10 | 1.60 | 1.15[b] | 2.45[a] | 1.55 |
| MD-16 (15) | 1.17 | 1.57 | 1.12[b] | 2.02[b] | 1.37 |
| SEM | 0.06 | 0.20 | 0.08 | 0.11 | 0.15 |
| Pr > F | 0.7340 | 0.9946 | 0.0002 | 0.0002 | 0.7176 |

[1]Subjective Visual scores were given as follows: 1 = Empty; 2 = Partially full; 3 = Full.
[2]Feed was withdrawn 12 hrs before processing. MD-0 (no egg albumin added) and MD-16 (16% egg albumin added) were fed for 9 hr. followed by 3 hr withdrawal before processing.
[3]Conventional Feed Withdrawal.
Values within a column with no common superscripts differ significantly (P < 0.05)

Example 2

Evaluation of Starch Hydrolysate-based Feed Withdrawal Compositions: Effects on Live Weight Changes and Carcass Measurements Physical Form: White pellets
Acclimation Period: Included
Composition Formulations: Table 5

Materials and Methods

Day-old, male broiler chicks (n=125) were raised in floor pens on litter. Birds were fed a commercial broiler starter diet (Wenger Feeds, Rheems, Pa.; #1092-52; 23% CP, 4.5% fat, and 3100 Kcal/kg) from hatching until 3 weeks of age, then switched to a commercial broiler grower diet (Wenger Feeds, Rheems, Pa. #1093-53; 18% CP, 4% fat, 3200 Kcal/kg) for the remainder of the trial. At six weeks of age, birds were wing banded and allocated to 6 different pens with 12 birds each. Two pens each were assigned to one of three treatments:

(1) Control Group:
  Phase I (8 hr)—Consumed commercial broiler feed ad libitum.
  Phase II (12 hr)—Subjected to conventional feed withdrawal (FW) for 12 hr prior to slaughter.

(2) MD0 (Table 1):
  Phase I (8 hr)—Acclimation period.
  Phase II (12 hr)—Received feed withdrawal composition MD0 ad libitum for 9 hrs, followed by 3 hr of composition withdrawal prior to slaughter.
(3) MD16 (Table 1):
  Phase I (8 hr)—Acclimation period.
  Phase II (12 hr)—Received feed withdrawal composition MD16 ad libitum for 9 hrs, followed by 3 hr of composition withdrawal prior to slaughter.

Phase I (8 hr)—Acclimation Period: To ensure the acceptability of the feed withdrawal compositions, an acclimation period in which a 50% composition:50% broiler feed mixture was supplied for 4 hr, followed by a 75% composition; 25% broiler feed mixture for an additional 4 hr, was used. During the acclimation period, the control group continued to consume commercial broiler feed (grower) ad libitum.

Phase II (12 hr): At the end of the acclimation period, broiler feed was removed and each of the respective compositions was supplied alone for 9 hr as described earlier, while broiler feed was removed from the control group. Compositions were removed 3 hr prior to processing of all birds, thus, allowing for a total of 12 hr of feed withdrawal for the control group, and 3 hrs of composition withdrawal for the composition groups.

Feed and feed withdrawal composition consumption, beginning live weight, as well as final live weight prior to slaughter were obtained at the appropriate time intervals. At the end of the treatment period (12 hr), all birds were killed by exsanguination, eviscerated, and hot carcass weights were obtained. Carcasses were chilled for 1 hr in ice water, then hung and allowed to drain for 15 min before a chilled, drained weight was obtained. Carcasses were then individually bagged and stored at 4° C. for 24 hr, reweighed for a final chilled weight, and deboned right and left breast weights obtained.

Results

Birds on feed withdrawal composition treatments consumed 31 g of MD0 and 41 g of MD16, respectively, during the 9 hr period when compositions were provided exclusively (Table 8). Conventional feed withdrawal (FW) for 12 hr resulted in significant average live weight loss compared to provision of MD16 composition (Table 8). Moreover, MD0 birds had a final live weight loss intermediate between the control (FW) group and MD 16 group. This live weight loss was calculated by difference [(live weight at the end of the acclimation period) minus (live weight after treatment immediately prior to processing)]. Birds on FW lost 81 g live weight as compared to 34 and 17 g for birds on MD0 and MD16 treatments, respectively, the latter of which were significantly different from each other. Final live weights (covariate adjusted for live weight at the end of the acclimation period, immediately prior to initiation of treatments) of MD0 and MD16 birds were significantly higher than those of the control (FW) birds (2362 and 2378 vs. 2321 g, respectively). Control (FW) birds lost 3.24% of live weight in 12 hr, which was significantly greater than losses for MD0 and MD16 birds. Average percentage live weight loss for birds consuming MD0 was intermediate (1.46%) between the control (FW) and MD16 birds (0.69%) (Table 8).

Average hot carcass weight of the control (FW) group was significantly lower than MD0 and MD16 groups (Table 8), which were not statistically different from each other. Average chilled carcass weight for the MD16 group was 2.5% greater than for the controls. Water uptake by carcasses of the control (FW) and MD16 groups during chilling were similar to each other, but significantly greater than for the MD0 group (Table 8). Total deboned breast meat yield of MD16 birds was over 5% greater than for FW and MD0 birds (426 vs. 404 and 405 g, respectively) (Table 8).

Example 3

Evaluation of Starch Hydrolysate-based Feed Withdrawal Compositions: Effects on Live Weight Changes Physical Form: Colored (greenish/tan), amorphous aggregates
Acclimation Period: Not included
Composition Formulations: Table 6

Materials and Methods

Day-old male broiler chicks (n=45) were placed in floor pens (15 birds per pen). Chicks consumed commercial broiler starter diet (Wenger Feeds, Rheems, Pa. #1092-52; 23%, CP, 4.5% fat, and 3100 Kcal/kg) from hatching until 3 weeks of age, and were then switched to a commercial broiler grower diet (Wenger Feeds, Rheems, Pa. #1093-55; 18% CP, 4% fat, 3200 Kcal/kg) from 3 to 6 weeks of age. Feed and water were supplied ad libitum. At six weeks of age, groups were culled to ten birds per pen, and wing banded. Each pen was assigned to one of three treatments:

(1) Control Group: Received conventional feed withdrawal (FW) for 12 hr prior to slaughter.
(2) MD0: Broiler feed was withdrawn and birds received MD0 ad libitum for 9 hr, followed by 3 hr of composition withdrawal prior to slaughter.
(3) MD16: Broiler feed was withdrawn and birds received MD16 ad libitum for 9 hr, followed by 3 hr of composition withdrawal prior to slaughter.

Feed and composition consumption, beginning live weight, as well as final live weight prior to slaughter were obtained at the appropriate time intervals.

Results

Birds on composition treatments consumed 29.3 g of MD0 and 31.2 g of MD16, respectively, during the 9 hr period when feed withdrawal composition was provided ad libitum (Table 9). Conventional feed withdrawal (FW) for 12 hr resulted in significant live weight loss as compared to the MD16 treatment (Table 9). This live weight loss was calculated by difference [(initial live weight prior to feed withdrawal) minus (live weight after treatment and immediately prior to processing)]. Birds on feed withdrawal lost 76 g live weight as compared to 21 g for birds on the MD16 treatment. Numerical differences in live weight loss were observed between FW and MD0 groups (76 vs. 48 g, respectively). Final live weights (covariate adjusted for initial weight at start of treatments) of the MD 16 birds were significantly higher than those of the FW birds (2488 vs. 2435 g, respectively). On average, FW birds lost 2.97% of their live body weight in 12 hr, which was significantly greater than for the MD16 birds (0.83% live weight loss). MD0 birds lost 1.97% of their live body weight, which was intermediate between the FW and MD16 groups (Table 9).

Example 4

Evaluation of Starch Hydrolysate-based Feed Withdrawal Compositions: Effects on Live Weight Changes and Carcass Measurements Physical Form: Colored (greenish/tan), Amorphous aggregates.
Acclimation Period: Not included.
Composition Formulations: Table 6.

Materials and Methods

Day-old, male broiler chicks (n=120) were raised identically to the protocol followed by Example 3. At six weeks of age, birds were wing banded and allocated to 7 different pens with 15 birds per pen. Three pens were assigned to the MD16 treatment, three to the control treatment (FW), and one pen was assigned to the MD0 treatment. FW, MD0 and MD16 treatments were identical to those used in Example 3.

Feed and composition consumption, beginning live weight, as well as final live weight prior to slaughter were obtained at the appropriate time intervals. At the end of the treatment period (12 hr), all birds were killed by exsanguination, eviscerated, defeathered, and hot carcass weights were obtained. Carcasses were chilled for 1 hr in ice water, then hung and allowed to drain for 15 min. before a chilled, drained weight was obtained. Carcasses were individually bagged and stored at 4° C. for 24 hr, reweighed for a final chilled weight, and deboned right and left breast weights were obtained.

Results

Birds on feed withdrawal composition treatments consumed 32 g of MD0 and 36 g of MD16, respectively, during the 9 hr period when composition was provided ad libitum (Table 10). Similar to Example 3, conventional feed withdrawal (FW) for 12 hr resulted in significant live body weight loss compared to provision of MD16 composition (Table 10). Average live weight loss for birds consuming MD0 was intermediate between the FW group and the MD16 group. This live weight loss was calculated by difference [(initial live weight prior to treatment) minus (live weight after treatment and immediately prior to processing)]. Birds on feed withdrawal lost 78 g live weight compared to 54 and 34 g for birds on MD0 and MD16 treatments, respectively. Final live weights (covariate adjusted for initial weight at start of treatments) of the MD16 birds were higher than those of the FW and MD0 birds (2527 vs. 2484 and 2507 g, respectively). On average, FW birds lost 3.00% of their live body weight in 12 hr, which was greater than for the MD0 birds (2.11% average live weight loss) and MD16 birds (1.35% average live weight) (Table 10).

Hot carcass weight was not significantly affected by treatments, however, a numerical improvement was observed as a result of feeding the solid composition (Table 10). Chilled carcass weight was greater for the MD16 birds than controls. Water uptake by the carcass during chilling was not significantly affected (Table 10). A numerical increase in absolute yield of deboned breast meat was observed for composition fed groups (Table 11).

TABLE 5

| Ingredient | Composition formulations.[1] | |
| --- | --- | --- |
| | MD0 | MD16 |
| | % | |
| MALTRIN ®-M150[2] | 99.30 | 83.30 |
| Dehydrated Egg White | 0.000 | 16.00 |
| NaCl | 0.144 | 0.144 |
| KCl | 0.080 | 0.080 |
| Tri-K-Citrate | 0.520 | 0.520 |
| | mg/lb | |
| Thiamine | 1.610 | 1.610 |
| Riboflavin (B$_2$) | 2.680 | 2.680 |
| Niacin | 22.30 | 22.30 |
| Pyridoxine (B$_6$) | 2.680 | 2.680 |

[1]The powdered composition formulations were pelleted by placing the powder in a Teflon mold and allowing it to absorb moisture in a sealed, humidified chamber for 2 hrs at room temperature, then transferring it to a drying oven and allowing it to dry at 200° C.
[2]Product of Grain Processing Corporation, Muscatine, IA. Any commercially available starch hydrolysate with a DE in the range of 15–18 is suitable.

TABLE 6

| Ingredient | Composition formulations[1] | |
| --- | --- | --- |
| | MD0 | MD16 |
| | % | |
| MALTRIN ®-M150[2] | 99.30 | 83.30 |
| Dehydrated Egg White | 0.000 | 16.00 |
| NaCl | 0.144 | 0.144 |
| KCl | 0.080 | 0.080 |
| Tri-K-Citrate | 0.520 | 0.520 |
| | mg/lb | |
| Thiamine | 1.610 | 1.610 |
| Riboflavin (B$_2$) | 2.680 | 2.680 |
| Niacin | 22.30 | 22.30 |
| Pyridoxine (B$_6$) | 2.680 | 2.680 |

[1]The powdered composition formulations were aggregated by mixing the powder in a commercial dough mixer with diluted food coloring, to give it a greenish/tan color resembling broiler feed. Food color was dripped into the mixture slowly to prevent clumping of the powder. The aggregated, amorphous particles, approximately 0.5–1.0 cm in length, were then transferred to a drying oven and allowed to dry at 125° C.
[2]Product of Grain Processing Corporation, Muscatine, IA. Any commercially available starch hydrolysate with a DE in the range of 15–18 is suitable.

TABLE 8

Evaluation of starch hydrolysate-based, solid feed withdrawal compositions (formulations as per Table 5) fed to 6 week-old male broilers (with acclimation period).

| Treatment[1] | Final Live Weight (g)* | Live Weight Change (Final Live Wt-Acclimation*) (g) | Live Weight Change (Final Live Wt-Acclimation[2]) (%) | Hot Eviscerated Carcass Weight (g)* | Chilled Carcass Weight (g)* | Percent Water Uptake* | Total Deboned Breast Yield (g)* | 9 hr Composition Consumption (g/bird) |
|---|---|---|---|---|---|---|---|---|
| Control | 2321[c] | (−)81[c] | (−)3.24[c] | 1608[b] | 1653[c] | 2.72[a] | 404[b] | |
| MD0 | 2362[b] | (−)34[b] | (−)1.46[b] | 1637[a] | 1668[c] | 1.93[b] | 405[b] | 31 |
| MD16 | 2378[ab] | (−)17[a] | (−)0.69[a] | 1652[a] | 1694[a] | 2.54[a] | 426[a] | 41 |
| Pr > F | 0.0001 | 0.0001 | 0.0001 | 0.0023 | 0.0064 | 0.0197 | 0.0142 | |
| Pooled SEM | 6.5 | 6.4 | 0.26 | 8.2 | 8.7 | 0.18 | 5.3 | |

N = 24 birds per treatment.
*Covariate adjusted for body weight immediately prior to FW (end of acclimation).
[1]Control: Conventional feed withdrawal for 12 hrs
MD0: 8 hr acclimation period, 9 hr on ad libitum composition and 3 hrs withdrawal prior to slaughter.
MD16: 8 hr acclimation period, 9 hr on ad libitum composition (with 16% egg white) and 3 hrs withdrawal prior to slaughter.
[2]Acclimation period consisted of feeding a 50:50 followed by a 75:25 composition:feed mix for 4 hr each.
[abc]Values within a column with no common superscripts differ significantly (P < 0.05).

TABLE 9

Effects of pelleted, starch hydrolysate-based feed withdrawal compositions (formulations as per Table 6) fed to 6 week-old male broilers on live weight (no acclimation period).

| Treatment[1] | Final Live Weight (g)* | Live Weight Change (Initial-Final Live Wt) (g) | Live Weight Change (%) | 9 hr Composition Consumption (g/bird) |
|---|---|---|---|---|
| Control | 2435[b] | 76.5[a] | 2.97[a] | 0 |
| MD0 | 2458[b] | 48.2[ab] | 1.97[ab] | 29.3 |
| MD16 | 2488[a] | 21.2[b] | 0.83[b] | 31.2 |
| Pr>F | 0.0064 | 0.0051 | 0.0065 | |
| SEM | 11 | 10 | 0.43 | |

N = 10 birds per treatment.
*Covariate adjusted for initial body weight.
[1]Control: Conventional feed withdrawal for 12 hrs
MD0: 9 hr on composition and 3 hrs composition withdrawal prior to slaughter.
MD16: 9 hr on composition (with 16% egg white) and 3 hrs composition withdrawal prior to slaughter.
[abc]Values within a column with no common superscript differ significantly (P<0.05).

TABLE 10

Effects of pelleted, starch hydrolysate-based feed withdrawal compositions (formulations as per Table 6) fed to 6 week-old male broilers, on live weight and carcass responses (no acclimation period).

| Treatment[1] | Final Live Weight (g)* | Live Weight Change (Final Live Wt-Initial Wt) (g) | Live Weight Change (%) | Hot Eviscerated Carcass Weight (g)* | Chilled Carcass Weight (g)* | 9 hr Composition Consumption (g/bird) |
|---|---|---|---|---|---|---|
| Control | 2484[c] | (−)78[a] | (−)3.00[a] | 1760 | 1795[b] | 0 |
| MD0 | 2507[b] | (−)54[b] | (−)2.11[b] | 1771 | 1806[ab] | 32 |
| MD16 | 2527[a] | (−)34[c] | (−)1.35[c] | 1777 | 1817[a] | 36 |
| Pr > F | 0.0001 | 0.0001 | 0.0001 | 0.2667 | 0.1040 | |
| Pooled SEM | 4.9 | 4.9 | 0.19 | 8.7 | 8.5 | |

N = 45 (control), 45 (MD16) and 15 (MD0) treatment.
*Covariate adjusted for initial weight.
[1]Control: Conventional feed withdrawal for 12 hrs
MD0: 9 hrs on ad libitum composition and 3 hrs composition withdrawal prior to slaughter.
MD16: 9 hrs on ad libitum composition (with 16% egg white) and 3 hrs composition withdrawal prior to slaughter
[abc]Values within a column with no common superscripts differ significantly (P < 0.05).

TABLE 11

Effects of pelleted, starch hydrolysate-based feed withdrawal compositions (formulations as per Table 6) fed to 6 week-old male broilers on deboned breast meat yield (no acclimation period).

| Treatment[1] | Deboned Left Breast Weight (g)* | Deboned Right Breast Weight (g)* | Total Breast Weight (g)* |
|---|---|---|---|
| Control | 230 | 225 | 455 |
| MD0 | 235 | 229 | 466 |
| MD16 | 233 | 227 | 461 |
| Pr>F | 0.4498 | 0.5885 | 0.5061 |
| Pooled SEM | 2.87 | 2.92. | 8.53 |

N = 45 (control), 45 (MD16) and 15 (MD0) treatment.
*Covariate adjusted for initial weight.
[1]Control: Conventional feed withdrawal for 12 hrs
MD0: 9 hrs on ad libitum composition and 3 hrs composition withdrawal prior to slaughter.
MD16: 9 hrs on ad libitum composition (with 16% egg white) and 3 hrs composition withdrawal prior to slaughter Summary of Starch Hydrolysate-based Feed
Withdrawal Composition Responses in Market-Age
(6-week-old) Broiler Chickens I. With Use of 8-hour Acclimation Period Prior to Feed Withdrawal (Examples 1 and 2)

1. Following an 8 hr acclimation period during which ratios of broiler grower feed and composition were provided (4 hrs of a 50:50 mix of broiler feed:composition followed by 4 hrs of a 75:25 mix of broiler feed:composition), broilers (6-wk-old: 2.3 kg average BW) consumed approximately 34 g of composition per bird (15 g/kg BW) during a conventional (12 hr) period of feed withdrawal (average of 2 experiments; 73–74 birds total/composition group). Consumption of MD16 (16% added crude protein as egg white) (37.2 g/bird) was greater than MD0 (no added protein) (31.1 g/bird). (Ex. 1 & 2).
2. Conventional (12 hr) feed withdrawal resulted in live weight losses of approximately 3% (2.94%) of body weight (70 g), whereas use of MD0 (no added protein source) reduced live weight loss to 1.28% (30 g), and use of MD16 (16% added crude protein) reduced this further to <1% (0.69% 18 g), (Ex. 1 & 2).
3. Weight of the eviscerated, chilled, drained carcass was 2.48% (41 g) greater for birds fed MD16 (with prior acclimation) than control birds subjected to conventional feed withdrawal. Total deboned breast meat yield was greater (5.45%, 22 g) for birds provided MD16, versus controls. (Ex. 2)
4. Following exclusive provision of composition ad libitum for 9 hr, subsequent withdrawal of composition for 3 hr resulted in upper gastrointestinal tract (GIT) (i.e., crop and gizzard) emptiness equivalent to 12 hr of conventional feed withdrawal (based upon visual scoring), and greater emptiness of the lower GIT (intestine and ceca). (Ex. 1)

II. Without Use of 8-hour Acclimation Period Prior to Feed Withdrawal (Examples 3 and 4)

1. With no prior acclimation, broilers (6-wk-old; 2.5 kg average BW) consumed approximately 34 g of composition per bird (13 g/kg BW) during a conventional (12 hr) period of feed withdrawal (average of 2 experiments; 25–55 birds total/composition group). Consumption of MD16 was greater (35.1 g/bird) than MD0 (30.9 g/bird). (Ex. 3 & 4).
2. Consistent with previous experiments, conventional (12 hr) feed withdrawal resulted in live weight losses of approximately 3% (2.99%) of body weight (78 g). With no prior acclimation, use of MD0 (no added protein source) reduced live weight loss to 2.05% (52 g), and use of MD16 (16% added crude protein) reduced this further to 1.25% (28 g). (Ex. 3 & 4).
3. Weight of the eviscerated, chilled, drained carcass was 1.23% (22 g) greater for birds fed MD16 (with no prior acclimation) than control birds subjected to conventional feed withdrawal. Total deboned breast meat yield was numerically, but not significantly greater (1.32%, 5 g) for birds provided MD16, versus controls. (Ex. 4)

III. Overall Responses and Benefits of the Products

1. An acclimation is not necessary for voluntary consumption of solid, starch hydrolysate-based feed withdrawal compositions. Consumption of MD 16 averages approximately 36 g/bird and is greater than consumption of MD0, which averages approximately 31 g/bird, regardless of prior acclimation status for either composition formulation.
2. Broilers consuming starch hydrolysate-based compositions during the conventional period of feed withdrawal retain greater live weights at processing in comparison to birds subjected to conventional feed withdrawal regimes. Live weight loss is reduced approximately 32% by consumption of MD0 and 64% by consumption of MD16, in comparison to controls.
3. Consumption of starch hydrolysate-based feed withdrawal compositions during the conventional period of feed withdrawal improves fresh product yield, in terms of eviscerated, chilled carcass weight, and deboned breast meat yield.
4. Starch hydrolysate-based feed withdrawal compositions, as formulated, are rapidly and completely solubilized in the aqueous environment of the upper GIT of the chicken, effectively hydrolyzed, and readily absorbed by the intestinal mucosa. The compositions contribute no particulate residue to the gut when provided together with water ad libitum, and improve evacuation of the lower GIT (intestine and ceca), in comparison to conventional feed withdrawal. Starch hydrolysate-based compositions are completely cleared from the upper portion of the GIT (crop) after only 3 hr of withdrawal, equivalent to the degree of clearance of feed residue normally necessitating much longer feed withdrawal periods.
5. Because consumption of composition provides a source of readily available carbohydrate, and ensures water consumption throughout the conventional feed withdrawal period, animals are better able to maintain blood glucose concentrations, and tissue hydration, and are less physiologically stressed than if subjected to conventional feed withdrawal regimes. This predicts lower mortalities and less bruising (and consequently subsequent downgrades) during the period of withdrawal, catching, and transporting birds to the processing plant.

Having described the invention with reference to particular compositions, theories of effectiveness, and the like, it will be apparent to those of skill in the art that it is not intended that the invention be limited by such illustrative embodiments or mechanisms, and that modifications can be made without departing from the scope or spirit of the invention, as defined by the appended claims. It is intended that all such obvious modifications and variations be included within the scope of the present invention as defined in the appended claims. The claims are meant to cover the claimed components and steps in any sequence which is effective to meet the objectives there intended, unless the context specifically indicates to the contrary.

What is claimed is:

1. A method of emptying feed residue from the gastrointestinal tract of a monogastric meat animal during the feed withdrawal period prior to slaughter, comprising:
   administering to said animal a feed withdrawal composition comprising at least 70% by weight of a low dextrose equivalent (D.E.) starch hydrolysate.

2. The method according to claim 1, wherein the feed withdrawal composition is administered to the animal during the last 24 hours prior to slaughter.

3. The method according to claim 2, wherein administration of the feed withdrawal composition to the animal is discontinued for a period of up to 3 hours prior to slaughter.

4. The method according to claim 1, wherein the feed withdrawal composition is administered to the animal ad libitum.

5. The method according to claim 1, wherein the starch hydrolysate of the feed withdrawal composition has a D.E. of between about 15–25.

6. The method according to claim 1, wherein the feed withdrawal composition includes between about 80–85% by weight starch hydrolysate.

7. The method according to claim 1, wherein the feed withdrawal composition includes between about 84–99.9% by weight of the starch hydrolysate.

8. The method according to claim 1, wherein said monogastric meat animal is selected from the group consisting of chicken, turkey and duck.

9. The method according to claim 1, wherein said monogastric meat animal are swine.

10. The method according to claim 1, wherein the feed withdrawal composition administered further includes a water soluble, highly digestible protein source.

11. The method according to claimed 10, wherein the highly digestible protein source is selected from the group consisting of dehydrated egg powder, egg white, casin, ovalbumin, lactalbumin, and hydrolyzed vegetable protein.

12. The method according to claim 10, wherein the feed withdrawal composition administered includes up to 30% by weight of the highly digestible protein source.

13. The method according to claim 1, wherein the feed withdrawal composition administered further includes a sodium salt.

14. The method according to claim 13, wherein the sodium salt comprises from less than about 0.5–1.0% of the feed withdrawal composition administered.

15. The method according to claim 1, wherein the feed withdrawal composition administered further includes at least one additive selected from the group of electrolytes, vitamins, dextrose, and a dextrose equivalent.

16. The method according to claim 15, wherein the feed withdrawal composition administered includes electrolytes.

17. The method according to claim 16, wherein the electrolytes comprise a citrate salt.

* * * * *